United States Patent [19]

Nakahama et al.

[11] Patent Number: 5,276,081
[45] Date of Patent: Jan. 4, 1994

[54] RUBBER COMPOSITION

[75] Inventors: Hidenari Nakahama; Tosiaki Kimura; Takasi Misima, all of Ichihara, Japan

[73] Assignee: Mitsui Petrochemical Industries, Ltd., Tokyo, Japan

[21] Appl. No.: 60,518

[22] Filed: May 13, 1993

Related U.S. Application Data

[63] Continuation of Ser. No. 399,004, Aug. 28, 1989, abandoned.

[30] Foreign Application Priority Data

Aug. 29, 1988 [JP] Japan .................. 63-214332

[51] Int. Cl.$^5$ .............................. C08K 5/01
[52] U.S. Cl. ................... 524/491; 524/581; 525/319; 525/320; 525/322
[58] Field of Search ............... 524/491, 581; 525/319, 525/320, 322

[56] References Cited

U.S. PATENT DOCUMENTS

| | | | |
|---|---|---|---|
| 3,884,993 | 5/1975 | Gros | 525/211 |
| 3,952,787 | 4/1976 | Okado et al. | 428/912 |
| 4,445,562 | 5/1984 | Böhm et al. | 525/313 |

FOREIGN PATENT DOCUMENTS

| | | | |
|---|---|---|---|
| 0090418 | 10/1983 | European Pat. Off. | 525/322 |
| 0264653 | 4/1988 | European Pat. Off. | |
| 46-29012 | 8/1971 | Japan . | |
| 46-34989 | 10/1971 | Japan . | |
| 49-8541 | 1/1974 | Japan . | |
| 50-128735 | 10/1975 | Japan . | |
| 60-18316 | 1/1985 | Japan | 525/320 |
| 61-36020 | 8/1986 | Japan . | |
| 61-223049 | 10/1986 | Japan . | |

*Primary Examiner*—John C. Bleutge
*Assistant Examiner*—Mark Sweet
*Attorney, Agent, or Firm*—Sherman and Shalloway

[57] ABSTRACT

A rubber composition containing (A) 100 parts by weight of an amorphous or low-crystalline ethylene-α-olefin copolymer rubber having an ethylene content of 70 to 90 mole %, a molecular weight distribution (Mw/Mn) of 3.0 or more and a Mooney viscosity $ML_{1+4}$ (100° C.) of 5 to 80; and (B) 1 to 120 parts by weight of a liquid ethylene-α-olefin random copolymer having an ethylene content of 40 to 90 mole % and an intrinsic viscosity [η] of 0.01 to 0.4 dl/g as measured in decalin at 135° C.

11 Claims, No Drawings

RUBBER COMPOSITION

This application is a continuation of U.S. patent application Ser. No. 07/399,004, filed Aug. 28, 1989 now abandoned.

BACKGROUND OF THE INVENTION

1. Field of the Invention

The present invention relates to a rubber composition. More specifically, it relates to a rubber composition containing an amorphous or low crystalline ethylene-α-olefin copolymer rubber and a liquid ethylene-α-olefin random copolymer and having an excellent processability, thermal aging resistance and wear resistance, which is particularly usable for general rubber articles such as a belt for industrial use, a hose, and a seal or the like.

2. Description of the Related Art

Rubbers having a backbone which comprises a single bond are known to have an excellent thermal aging resistance, and a typical example thereof is an amorphous ethylene-propylene-diene copolymer rubber. This rubber comprises ethylene-propylene as a main component, and a diene such as dicyclopentadiene, ethylidene-norbornene or the like is random copolymerized to permit a crosslinking by sulfur. If a stronger thermal aging resistance is required, however, an amorphous ethylene-propylene copolymer rubber free of such a diene is preferred. In view of vulcanizing factors such as the sulfur used for crosslinking the amorphous ethylene-propylene-diene copolymer rubber, a polysulfide bond in addition to a monosulfide bond may be present in the rubber. Such a polysulfide bond is unsuitable for heat-resistant use because of its low heat-resistance. On the other hand, a vulcanizing agent such as an organic peroxide used in an amorphous ethylene-α-olefin copolymer rubber, particularly in an amorphous ethylene-propylene copolymer rubber, has an excellent thermal stability because a sigma bonding is formed between molecules. However ethylene-α-olefin copolymer rubbers still have an unsatisfactory thermal aging resistance or wear resistance as a material of maintenance-free products such as a heat-resistant belt, hose or the like which can be used for a long period without impairing their properties. As a means for solving the problem, an increase of the ethylene content in an amorphous ethylene-α-olefin copolymer is known, but an amorphous ethylene-α-olefin copolymer rubber having a high content of ethylene has a remarkably inferior roll processability, and thus is not used in practice for the forming of articles.

Currently, a material having properties antagonistic to each other, such as a high ethylene content and excellent roll processability, is required, but commercially available amorphous ethylene-α-olefin copolymer rubbers, in particular an amorphous ethylenepropylene copolymer rubber, are now designed with a stress on the roll processability thereof and have a low ethylene content of about 60 mole %, and thus such copolymers have problems with regard to the thermal aging resistance or wear resistance thereof.

SUMMARY OF THE INVENTION

Accordingly, an object of the present invention is to provide a rubber composition having an excellent processability, thermal aging resistance and wear resistance, whereby the article hardness thereof can be optionally controlled without impairing these properties.

Other objects and advantages of the present invention will be apparent from the following description.

In accordance with the present invention, there is provided a rubber composition comprising (A) 100 parts by weight of an amorphous or low-crystalline ethylene-α-olefin copolymer rubber having an ethylene content of 70 to 90 mole %, a molecular weight distribution (Mw/Mn) of 3.0 or more and a Mooney viscosity $ML_{1+4}$ (100° C.) of 5 to 80, preferably 10 to 60 and (B) 1 to 120 parts by weight, preferably 5 to 50 parts by weight, of a liquid ethylene-α-olefin random copolymer having an ethylene content of 40 to 90 mole % and an intrinsic viscosity $[\eta]$ of 0.01 to 0.4 dl/g as measured in decalin at 135° C.

DESCRIPTION OF THE PREFERRED EMBODIMENT

The amorphous or low-crystalline ethylene-α-olefin copolymer rubber (A) usable in the present invention is an amorphous or low crystalline ethylene-α-olefin copolymer comprising an ethylene component and an α-olefin component. The α-olefin includes those having 3 to 20 carbon atoms: Examples of such α-olefins are propylene, 1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene or the like. Particularly, the use of propylene or 1-butene is preferable.

Such an amorphous or low-crystalline ethylene-α-olefin copolymer rubber (A) has an ethylene content of 70 to 90 mole %, preferably 75 to 85 mole %. When the ethylene content is less than 70 mole %, the thermal aging resistance and wear resistance are lowered, and when the ethylene content is more than 90 mole %, the copolymer rubber becomes resinous and the roll processability becomes very poor. In addition, the article hardness is excessively increased to an undesirable value.

The molecular weight distribution (Mw/Mn) of the amorphous or low-crystalline ethylene-α-olefin copolymer rubber (A) is 3.0 or more, preferably 5.0 or more. The amorphous or low-crystalline ethylene-α-olefin copolymer rubber (A) having such a molecular weight distribution has extreme parts; one being a part having a high ethylene content and a high molecular weight and the other being a part having a high ethylene content and a low molecular weight. Therefore, such a copolymer rubber has a good processability and a practical tensile strength, and has an excellent thermal aging resistance and wear resistance.

The amorphous or low-crystalline ethylene-α-olefin copolymer rubber (A) has a Mooney viscosity $ML_{1+4}$ (100° C.) of 5 to 80, preferably 10 to 60.

The other liquid ethylene-α-olefin random copolymer (B) is an amorphous or low-crystalline ethylene-α-olefin random copolymer comprising an ethylene content and an α-olefin component and exhibiting fluidity at a usual temperature. The α-olefin preferably has 3 to 20 carbon atoms, and specifically has the same content as the above-mentioned component (A).

Such a liquid ethylene-α-olefin random copolymer (B) has an ethylene content of 40 to 90 mole %, preferably 75 to 85 mole %, and an intrinsic viscosity $[\eta]$ measured in decalin at 135° C. of 0.01 to 0.4 dl/g, preferably 0.1 to 0.4 dl/g.

Such a liquid ethylene-α-olefin random copolymer (B) will not substantially lower the thermal aging resistance of the substrate rubber (A) and can provide the rubber composition with an excellent processability while maintaining an article hardness at the same level as the hardness of an article in which an oil is incorporated.

The amount of the liquid ethylene-α-olefin random copolymer (B) to be incorporated is generally in a proportion of 1 to 120 parts by weight, preferably 5 to 50 parts by weight to 100 parts by weight, of an amorphous or low-crystalline ethylene-α-olefin copolymer rubber (A).

The rubber composition of the present invention may be incorporated with additives currently used for rubber, such as a vulcanizing agent, a reinforcing agent, a softening agent, an anti-aging agent, a metal activating agent, a processing aid or other additives.

The vulcanizing agents usable in the present invention are those which can vulcanize a usual ethylene-α-olefin copolymer rubber. Examples of the typical vulcanizing agent usable in the present invention are an organic peroxide such as dicumyl peroxide, di-tert-butyl peroxide, 2,5-dimethyl-2,5-di-(tert-butylperoxy)hexane, 2,5-dimethyl-2,5-di-(tert-butylperoxy)-3-hexyne, 1,3-bis(tert-butyloxyisopropyl)benzene, 1,1-bis-(tert-butylperoxy)-3,3,5-trimethylcyclohexane, n-butyl-4,4-bis-(tert-butylperoxy)valerate, benzoyl peroxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide, tert-butylcumyl peroxide, or the like.

Examples of the reinforcing agent usable in the present invention are a variety of carbon blacks such as SRF, GPE, FEF, HAF, ISAF, SAF, FT, MT or the like; pulverized silicate; or any mixture thereof.

The softening agent usable in the present invention includes, for example, petroleum type substances such as a process oil, a lubricating oil, a paraffin, a liquid paraffin, a petroleum asphalt, a vaseline or the like; coal tars such as a coal tar, a coal tar pitch or the like; fats such as a caster oil, a linseed oil, a rape oil, a coconut oil or the like; waxes such as a tall oil, a factice, a beeswax, a carnauba wax, a lanolin or the like; or any mixture thereof.

The anti-aging agent usable in the present invention includes, for example, aromatic secondary amines such as a phenylnaphthylamine, N,N'-di-2-naphthyl-p-phenylenediamine or the like; phenol type stabilizing agents such as dibutylhydroxytoluene, tetrakis[methylene-(3,5-di-t-butyl-4-hydroxy)hydrocinnamate]methane or the like; thioether type stabilizing agents such as a bis-[2-methyl-4-{3-n-alkylthiopropionyloxy}-5-t-butylphenyl]sulfide or the like; dithiocarbamic acid type stabilizing agents such as nickel dibutyl dithiocarbamate or the like; or any mixture thereof.

The metal activating agent usable in the present invention includes, for example, magnesium oxide, a zinc higher fatty acid, red lead oxide, litharge, calcium oxide or the like; or any mixture thereof.

The processing aid usable in the present invention includes, for example, ricinoleic acid, stearic acid, palmitic acid, lauric acid, barium stearate, calcium stearate, zinc stearate or esters of the aforementioned acids, higher fatty acids, a salt or ester thereof, or any mixture thereof.

The additives usable in the present invention are those popularly used, in addition to the above-mentioned, and these additives include a vulcanizing aid, a heat resistant stabilizing agent, a weathering agent, a filling agent, a coloring agent or the like.

These additives for rubber may be incorporated in the composition in an appropriate amount according to necessity and within the range wherein the object of the present invention will not be impaired.

The above-mentioned components (A) and (B) and a variety of additives for rubber are kneaded in a conventional well-known kneading apparatus such as an open type mixing roll, a non-open type Banbury mixer, an extruder, a kneader, a continuous mixer or the like, to give a rubber composition.

The rubber composition thus obtained will not substantially vary the thermal aging resistance or wear resistance of the amorphous or low-crystalline ethylene-α-olefin copolymer rubber having a high ethylene content, and enhances the kneading processabilities such as rolling, banburying, calendering or the like, and the article hardness can be freely changed by changing the amount of the component (B).

The rubber composition according to the present invention can be used appropriately for rubber articles wherein an amorphous or low-crystalline ethylene-α-olefin copolymer rubber may be used, particularly for rubber articles such as a belt, for industrial use, hose or seal or the like, for which a thermal aging resistance and wear resistance are required.

As described above, the rubber composition of the present invention comprises the components (A) and (B), and thus has an excellent processability, thermal aging resistance and wear resistance. The hardness of an article made of the rubber composition can be freely controlled without impairing these properties.

EXAMPLES

The present invention will now be further illustrated by, but is by no means limited to, the following Examples. All parts in these Examples are by weight.

Evaluation tests in the Examples are conducted according to the following methods:

(1) Roll processability

The wrapping properties on a forward roll are compared.
E: very good;
G: good;
F: normal;
P: poor (2) Wear resistance The evaluation was made by the DIN wear resistance test. The amount worn is indicated by ml.

(3) Thermal aging resistance

The evaluation was conducted by determining the retention rate of tensile strength at break and tensile elongation at break of original samples before tests and respective samples which had been left to stand in a thermostatic bath at 180° C. for 1, 3, 5, 7 and 10 days:

$$\text{Strength retention at break } [AR(T_B)] = \frac{\text{Tensile strength after thermal aging}}{\text{Tensile strength of original sample}} \times 100$$

$$\text{Elongation retention at break } [AR(E_B)] = \frac{\text{Tensile elongation after thermal aging}}{\text{Tensile elongation of original sample}} \times 100$$

(4) Dry physical properties

Tensile stress on 300% elongation (M 300), tensile strength at break ($T_B$), elongation at break ($E_B$), and hardness ($H_S$) were measured by a JIS (Japanese Industrial Standards) A hardness meter according to JIS K 6301.

EXAMPLE 1

A 20 parts amount of a liquid ethylene-propylene random copolymer having an ethylene content of 75 mole % and an intrinsic viscosity [η] of 0.24 dl/g, 1 part of stearic acid, 5 parts of zinc white, 55 parts of FEF carbon black (ASAHI CARBON K.K., trade mark), 10 parts of a paraffin oil (IDEMITSU KOSAN K.K., trade mark: DIANA PROCESS OIL PW380), 1.0 part of an amine anti-aging agent (OUCHI SHINKO KAGAKU K.K., trade mark: NOKRAK 224), and 1.5 parts of benzimidazole (OUCHI SHINKO KAGAKU K.K., trade mark: NOKRAK MB) were kneaded with 100 parts of an amorphous ethylene-propylene copolymer rubber (EPR) having an ethylene content of 70 mole %, an $M_w/M_n$ of 7.0, and a Mooney viscosity $M_{L+4}$(100° C.) of 30, and 7.8 parts of dicumyl peroxide (content: 40% by weight) were added to the kneaded product to conduct roll kneading. The kneaded product was taken out portionwise in the form of a sheet and subjected to vulcanization to form test pieces. The test pieces thus obtained were tested according to the methods described above. The results are shown in Table 1.

EXAMPLES 2 TO 4

Test pieces were prepared and tested in the same manner as in Example 1, except that the ethylene content of the amorphous ethylene-propylene copolymer rubber was changed to 75 mole %, 80 mole %, and 85 mole %,

EXAMPLES 2 TO 8

Test pieces were prepared and tested in the same manner as in Example 1, except that the amorphous ethylene-propylene copolymer rubber in Example 3 was used and the ethylene content of the liquid ethylene-propylene random copolymer was changed to 60 mole %, 70 mole % and 80 mole %, respectively. The results are shown in Table 2.

EXAMPLES 9 TO 12

Test pieces were made and tested in the same manner as in Example 1, except that the amorphous ethylene propylene copolymer rubber in Example 3 was used and the incorporated amount of the liquid ethylene-propylene random copolymer having an ethylene content of 75% and an intrinsic viscosity [η] of 0.2 dl/g was changed to 5 parts, 20 parts, 25 parts and 30 parts, respectively. The results are shown in Table 3.

TABLE 1

| | Example 1 | Example 2 | Example 3 | Example 4 |
|---|---|---|---|---|
| EPR: | | | | |
| Ethylene content (mole %) | 70 | 75 | 80 | 85 |
| Mooney viscosity $ML_{1+4}$ (100° C.) | 30 | 30 | 30 | 30 |
| Mw/Mn | 7.0 | 7.2 | 6.9 | 7.0 |
| Liquid ethylene random copolymer: | | | | |
| Ethylene content (mole %) | 75 | 75 | 75 | 75 |
| [η] (dl/g) | 0.24 | 0.24 | 0.24 | 0.24 |
| $M_{300}$ (kg/cm²) | 30 | 48 | 53 | 65 |
| $T_B$ (kg/cm²) | 105 | 125 | 136 | 155 |
| $E_B$ (%) | 740 | 640 | 630 | 530 |
| HS (JIS A) | 63 | 65 | 68 | 71 |
| Roll processability | E | E | G | F |
| Wear resistance (ml) | 149 | 142 | 130 | 118 |
| Thermal aging resistance | | | | |
| AR ($T_B$) (%) | | | | |
| After 1 day | 98 | 99 | 99 | 99 |
| 3 days | 75 | 80 | 87 | 92 |
| 5 days | 45 | 50 | 63 | 78 |
| 7 days | 25 | 30 | 36 | 65 |
| 10 days | 12 | 18 | 25 | 35 |
| AR ($E_B$) (%) | | | | |
| After 1 day | 105 | 105 | 106 | 102 |
| 3 days | 100 | 100 | 105 | 100 |
| 5 days | 87 | 90 | 97 | 97 |
| 7 days | 65 | 70 | 76 | 94 |
| 10 days | 29 | 30 | 35 | 45 |

TABLE 2

| | Example 5 | Example 6 | Example 7 | Example 8 |
|---|---|---|---|---|
| EPR: | | | | |
| Ethylene content (mole %) | 80 | 80 | 80 | 80 |
| Mooney viscosity $ML_{1+4}$ (100° C.) | 30 | 30 | 30 | 30 |
| Mw/Mn | 7.5 | 7.4 | 7.2 | 7.4 |
| Liquid ethylene random copolymer: | | | | |
| Ethylene content (mole %) | 60 | 70 | 80 | 85 |
| [η] (dl/g) | 0.25 | 0.25 | 0.25 | 0.26 |
| $M_{300}$ (kg/cm²) | 50 | 52 | 56 | 60 |
| $T_B$ (kg/cm²) | 130 | 132 | 142 | 146 |
| $E_B$ (%) | 640 | 620 | 630 | 620 |
| HS (JIS A) | 66 | 68 | 68 | 69 |
| Roll processability | G | G | G | G |
| Wear resistance (ml) | 130 | 130 | 128 | 125 |
| Thermal aging resistance | | | | |
| AR ($T_B$) (%) | | | | |
| After 1 day | 93 | 99 | 100 | 100 |
| 3 days | 81 | 85 | 90 | 91 |
| 5 days | 52 | 60 | 70 | 72 |
| 7 days | 25 | 34 | 51 | 53 |
| 10 days | 12 | 21 | 30 | 39 |
| AR ($E_B$) (%) | | | | |
| After 1 day | 111 | 106 | 107 | 107 |
| 3 days | 108 | 104 | 105 | 102 |
| 5 days | 94 | 96 | 100 | 99 |
| 7 days | 64 | 73 | 80 | 85 |
| 10 days | 19 | 30 | 50 | 52 |

TABLE 3

| | Example 9 | Example 10 | Example 11 | Example 12 |
|---|---|---|---|---|
| EPR: | | | | |
| Ethylene content (mole %) | 80 | 80 | 80 | 80 |
| Mooney viscosity $ML_{1+4}$ (100° C.) | 30 | 30 | 30 | 30 |

TABLE 3-continued

| | Example 9 | Example 10 | Example 11 | Example 12 |
|---|---|---|---|---|
| Mw/Mn | 7.3 | 7.1 | 7.8 | 7.8 |
| Liquid ethylene random copolymer: | | | | |
| Ethylene content (mole %) | 75 | 75 | 75 | 75 |
| [η] (dl/g) | 0.24 | 0.24 | 0.24 | 0.24 |
| Incorporated amount (phr) | 5 | 20 | 25 | 30 |
| $M_{300}$ (kg/cm²) | 79 | 53 | 45 | 40 |
| $T_B$ (kg/cm²) | 162 | 136 | 121 | 118 |
| $E_B$ (%) | 530 | 630 | 640 | 680 |
| HS (JIS A) | | | | |
| Roll processability | E | E | E | E |
| Wear resistance (ml) | 119 | 128 | 135 | 142 |
| Thermal aging resistance | | | | |
| AR ($T_B$) (%) | | | | |
| After 1 day | 99 | 99 | 93 | 90 |
| 3 days | 90 | 87 | 81 | 80 |
| 5 days | 70 | 63 | 52 | 49 |
| 7 days | 48 | 36 | 25 | 20 |
| 10 days | 35 | 25 | 19 | 15 |
| AR ($E_B$) (%) | | | | |
| After 1 day | 111 | 106 | 108 | 108 |
| 3 days | 108 | 105 | 100 | 99 |
| 5 days | 94 | 97 | 95 | 90 |
| 7 days | 64 | 76 | 70 | 65 |
| 10 days | 19 | 35 | 30 | 28 |

We claim:

1. A rubber composition comprising (A) an amorphous or low crystalline ethylene-α-olefin copolymer rubber having an ethylene content of 70 to 90 mole %, a molecular weight distribution (Mw/Mn) of 3.0 or more and a Mooney viscosity $ML_{1+4}$ (100° C.) of 5 to 80; and (B) 5 to 50 parts by weight, based upon 100 parts by weight of the component (A), of a liquid ethylene-αolefin random copolymer having an ethylene content of 75 to 90 mole % and an intrinsic viscosity of 0.01 to 0.4 dl/g as measured in decalin at 135° C.

2. A rubber composition as claimed in claim 1, wherein the α-olefin of said ethylene-α-olefin copolymer rubber (A) is at least one selected from the group consisting of α-olefins having 3 to 20 carbon atoms.

3. A rubber composition as claimed in claim 2, wherein said α-olefin is at least one selected from the group consisting of propylene, 1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicocene.

4. A rubber composition as claimed in claim 1, wherein an ethylene content of said ethylene-α-olefin copolymer rubber (A) is 75 to 85 mole %.

5. A rubber composition as claimed in claim 1, wherein a molecular weight distribution (Mw/Mn) of said 5 -α-olefin copolymer rubber (A) is 5.0 or more.

6. A rubber composition as claimed in claim 1, wherein the ethylene-α-olefin copolymer rubber (A) has a Mooney viscosity $ML_{1+4}$ (100° C.) of 10 to 60.

7. A rubber composition as claimed in claim 1, wherein the α-olefin of said liquid ethylene-α-olefin random copolymer (B) is at least one selected from the group consisting of α-olefins having 3 to 20 carbon atoms.

8. A rubber composition as claimed in claim 7, wherein said α-olefin is at least one selected from the group consisting propylene, 1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicocene.

9. A rubber composition as claimed in claim 1, wherein an intrinsic viscosity [η]of said liquid ethylene-α-olefin random copolymer (B) is 0.1 to 0.4 dl/g.

10. A rubber composition as claimed in claim 1, wherein an ethylene content of said liquid ethylene-α-olefin random copolymer (B) is 75 to 85 mole %.

11. A rubber composition comprising (A) an amorphous or low crystalline ethylene-α-olefin copolymer rubber having an ethylene content of from 75 to 85 mole %, a molecular weight distribution (Mw/Mn) of 5.0 or more and a Mooney viscosity $Ml_{1+4}$ (100° C.) of 10 to 60; said α-olefin being selected from the group consisting of propylene, 1-butene, 1-hexene 4,-methyl-1-pentene; 3-methyl-1-pentene, 1-octene, 1-decene, 1-dodecene, 1-tetradecene, 1-hexadecene, 1-octadene, 1-eicocene, and mixtures thereof; and (B) 5 to 50 parts by weight, based upon 100 parts by weight of the ethylene-α-olefin copolymer rubber (A) of a liquid ethylene-α-olefin random copolymer having an ethylene content of from 75 to 85 mole %, and an intrinsic viscosity [η] of 0.1 to 0.4 dl/g as measured in decalin at 135° , said α-olefin of said liquid copolymer being selected from the group consisting of 1-butene, 1-hexene, 4-methyl-1-pentene, 3-methyl-1-pentene, 1-octene, 1-decene 1-dodecene, 1-tetradecene, 1-hexadecene, 1-octadecene, 1-eicocene, and mixtures thereof; said composition further comprising at least one rubber additive selected from vulcanizing agents, reinforcing agents, softening agents, anti-aging agents, metal activating agents, processing aids, vulcanizing aids, heat resistant stabilizing agents, weathering agents, filling agents and coloring agents.

* * * * *